(12) United States Patent
Chung et al.

(10) Patent No.: US 9,766,092 B2
(45) Date of Patent: Sep. 19, 2017

(54) METHOD FOR PERFORMING FUNCTION USING SENSOR DATA AND ELECTRONIC DEVICE FOR PROVIDING SAME

(71) Applicant: Samsung Electronics Co., Ltd., Gyeonggi-do (KR)

(72) Inventors: Dohyoung Chung, Seoul (KR); Jeongmin Park, Gyeonggi-do (KR); Donghwan Bae, Gyeonggi-do (KR); Jungwon Suh, Gyeonggi-do (KR); Cheoljun Lee, Gyeonggi-do (KR); Jeongho Cho, Gyeonggi-do (KR); Kyonggon Choi, Gyeonggi-do (KR); Jiwoong Oh, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/924,004

(22) Filed: Oct. 27, 2015

(65) Prior Publication Data

US 2016/0124498 A1    May 5, 2016

(30) Foreign Application Priority Data

Nov. 4, 2014    (KR) ........................ 10-2014-0152025

(51) Int. Cl.
*G01C 25/00* (2006.01)
(52) U.S. Cl.
CPC .................................... *G01C 25/00* (2013.01)

(58) Field of Classification Search
CPC . G01C 25/00; H04L 12/2803; H04L 12/2807; H04L 12/2809; H04L 2012/2847; H04L 2012/2849; H04L 2012/285
See application file for complete search history.

(56) References Cited

U.S. PATENT DOCUMENTS

| | | | |
|---|---|---|---|
| 2003/0040813 A1* | 2/2003 | Gonzales | H01H 15/005 700/19 |
| 2009/0113354 A1* | 4/2009 | Yun | G06F 3/017 715/863 |
| 2011/0314849 A1 | 12/2011 | Park et al. | |
| 2013/0204449 A1* | 8/2013 | Ahn | H04L 12/2803 700/291 |
| 2013/0262298 A1* | 10/2013 | Morley | H04M 1/05 705/39 |
| 2013/0339864 A1* | 12/2013 | Uusitalo | H04W 48/18 715/736 |

(Continued)

FOREIGN PATENT DOCUMENTS

| | | |
|---|---|---|
| KR | 10-2011-0139844 A | 12/2011 |
| KR | 10-1152595 B1 | 6/2012 |
| KR | 10-1169322 B1 | 7/2012 |

*Primary Examiner* — Tom Sheng
(74) *Attorney, Agent, or Firm* — Cha & Reiter, LLC

(57) ABSTRACT

An electronic device and method utilizes an external sensor group to facilitate miniaturization the device and repair/replacement of external sensors. An interface connected to an external sensor package including at least one sensor. A processor that when the external sensor package is connected through the interface, determines from which group the external sensor package is included in among preconfigured groups and controls the performance of a function corresponding to the determined group.

20 Claims, 13 Drawing Sheets

(56) References Cited

U.S. PATENT DOCUMENTS

2014/0204021 A1\* 7/2014 Sugihara .................. G06F 3/012
 345/156
2015/0015477 A1\* 1/2015 Hughes .................. G06F 1/3206
 345/156
2015/0029880 A1\* 1/2015 Burns .................... H04W 84/00
 370/252

\* cited by examiner

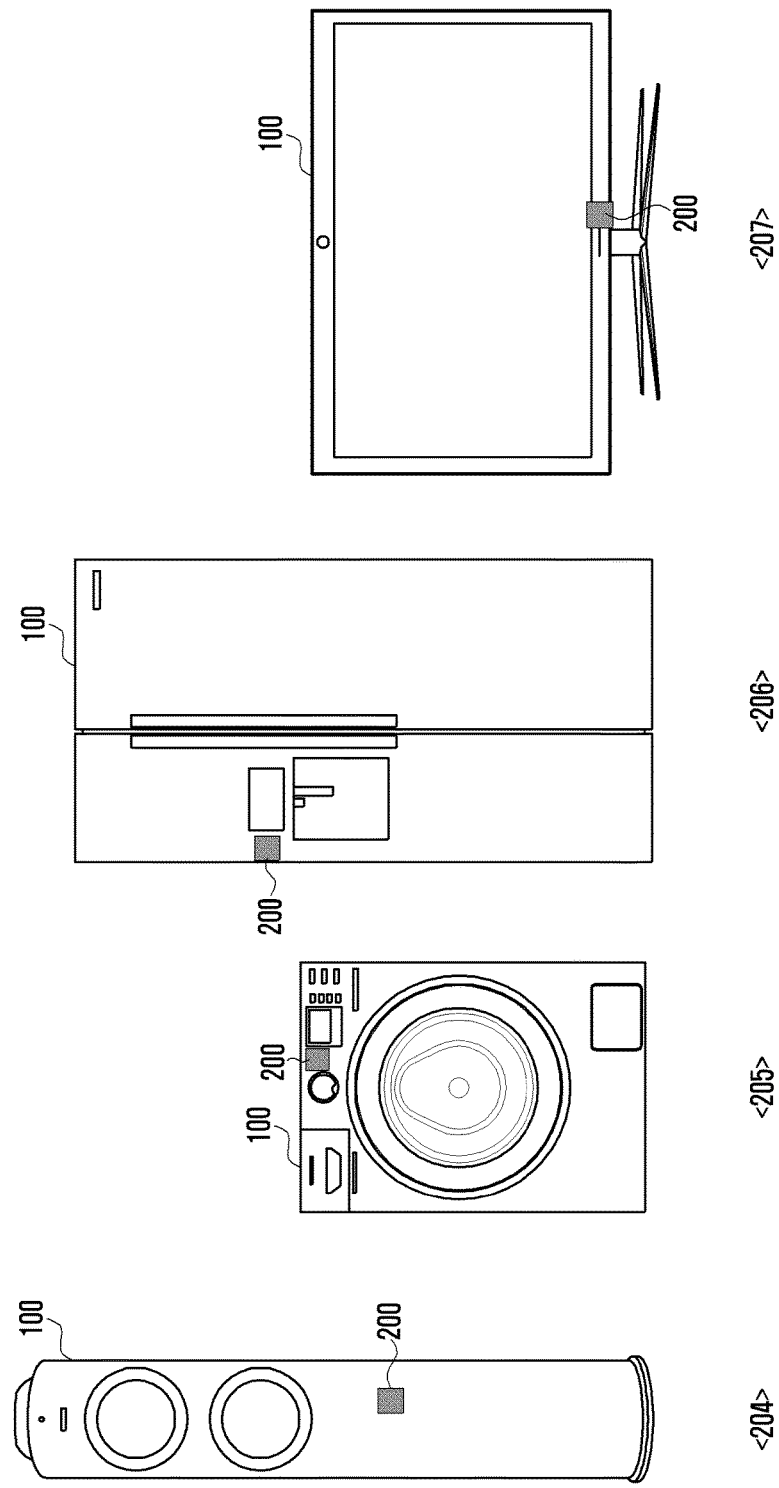

<301>

<303>

METHOD FOR PERFORMING FUNCTION USING SENSOR DATA AND ELECTRONIC DEVICE FOR PROVIDING SAME

CLAIM OF PRIORITY

This application claims the benefit of priority under 35 U.S.C. §119(a) of Korean Patent Application No. 10-2014-0152025, filed on Nov. 4, 2014, which is hereby incorporated by reference for all purposes as if fully set forth herein.

TECHNICAL FIELD

The present disclosure relates to a method for performing a function using sensor data and an electronic device for providing the method. More specifically, the present disclosure relates to a method for performing a function using sensor data detected by a sensor included in an external sensor package, which is connected to an electronic device, and the electronic device for providing the method.

BACKGROUND

With the development of technology, sensors that perform a variety of functions are often mounted on/in an electronic device which performs various functions. The sensors that are arranged within the electronic device are used in various applications, such as, for example, the movement recognition of a user of the electronic device, brightness and temperature/humidity detection, and surrounding ambient environment recognition such as air. In addition, the sensors used in electronic device have increased performance, and are becoming more diversified.

The type of sensor(s) used by the electronic device includes an inertia sensor using a 9-axis sensor, a motion sensor, a gesture sensor using infrared rays, an illuminance sensor, a fingerprint sensor, temperature and humidity sensors, an environmental sensor, and a UV sensor, etc., and the type of sensor has become diversified.

Recently, sensors which have been installed in a smart device are built-in types. That has been the cause of the difficulty of sensor replacement and error correction when a failure or an error occurs in the sensor.

As time goes by, a demand towards miniaturization of smart devices has continued. In order to meet such demand, manufacturers began to mount sensors which provide various functions inside the miniaturized smart devices. However, due to the limited mounting space of the smart devices, it is impossible to implement all sensors to perform the functions desired by the user.

SUMMARY

Accordingly, the disclosure is directed to embodiments of a method and apparatus capable of reducing the above-mentioned problems by performing a function using sensor data and an electronic device therefor, which will be described herein below.

According to various embodiments of the present disclosure, a method for performing a function using sensor data of an electronic may include: determining which group of an external sensor package is included among pre-configured groups when an external sensor package having at least one sensor is connected to the electronic device; and controlling the performance of a function corresponding to the determined group.

According to various embodiments of the present disclosure, a method for performing a function using sensor data of an electronic device may include: determining which group of an external sensor package is included among pre-configured groups when an external sensor package having at least one sensor is connected to the electronic device; and deactivating a function corresponding to a group including the external sensor package on the basis of the status information of the electronic device.

According to various embodiments of the present disclosure, a method for performing a function using sensor data of an electronic device may include: determining which group of an external package is included among pre-configured groups when an external sensor package having at least one sensor is connected to the electronic device; identifying, by a processor, a function corresponding to the group of the external package includes the external sensor package; determining, by the processor, whether an application that provides a particular service is stored on the basis of the identified function; and displaying a graphic user interface on the basis of the result of whether the application is stored.

An electronic device according to various embodiments of the present disclosure has an external sensor package detachably attached thereto and thus can reduce the spatial limitation from having a sensor mounted inside the electronic device.

According to various embodiments of the present disclosure, an electronic device may provide additional functions to a user by mounting an external sensor package that provides various functions.

According to various embodiments of the present disclosure, an electronic device may increase a user convenience of utilizing sensor data by controlling the activation of a function corresponding to an external sensor package on the basis of the state information of the electronic device.

According to various embodiments of the present disclosure, an electronic device may increase the availability of performing the function of the electronic device user using sensor data by receiving an application utilizing the sensor data provided by an external sensor package.

BRIEF DESCRIPTION OF THE DRAWINGS

The present disclosure will become more apparent to a person of ordinary skill in the art from the following detailed description in conjunction with the accompanying drawings, in which:

FIG. 2A and FIG. 2B, are diagrams illustrating respective types of an electronic device and an external sensor package arranged in an Internet of Things environment and vehicle infotainment device according to various embodiments of the present disclosure;

DETAILED DESCRIPTION

Figure 1:
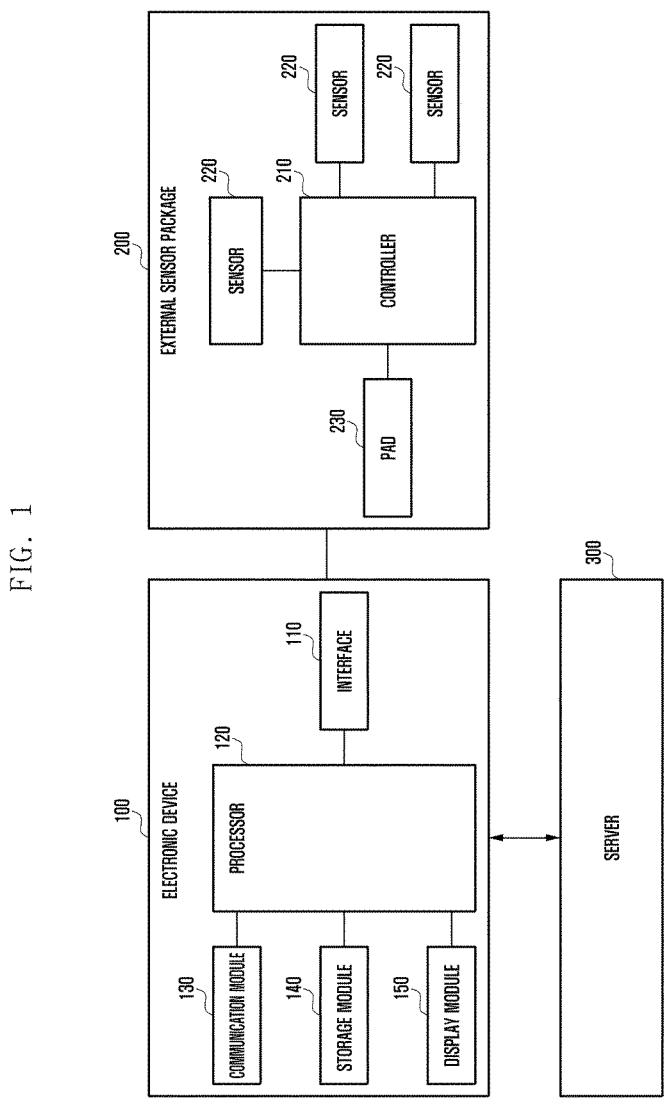
FIG. 1 is a diagram illustrating a connection of an electronic device, an external sensor package, and a server according to various embodiments of the present disclosure.

Hereinafter, various embodiments of the present disclosure will be described in more detail with reference to the accompanying drawings. A person of ordinary skill in the art will appreciate that the same elements will be designated by the same reference numerals although they are shown in different drawings. Further, a detailed description of a known function and configuration to a person of ordinary skill in the art which may make the subject matter of the present disclosure unclear may be omitted. FIG. 1 is a diagram illustrating a connection of an electronic device 100, an external sensor package 200, and a server/base station 300 according to various embodiments of the present disclosure.

Referring now to FIG. 1, the electronic device 100 according to an embodiment of the present disclosure may be connected to the external sensor package 200. The electronic device 100 may be connected to the external sensor package 200 by physical coupling. Alternatively or in addition thereto, the electronic device 100 may be connected to the server 300 via a wired/wireless communication.

The electronic device 100 according to an embodiment of the present disclosure may include an interface 110, a processor 120, a communication module 130, a storage module 140 and a display module 150. Each module includes hardware configured for operation, and may be omitted or added according to the type of the electronic device 100. For example, the display module 150 may be omitted depending on the type of the electronic device 100.

The interface 110 may be a device for connecting an external device. The interfaces 110 may be a device that is configured on the basis of a logical condition (e.g., an operating function, the type of a signal line, a signal condition, etc.), an electrical condition (e.g., impedance, a signal level, etc.), and a physical condition (e.g., a shape of a connector, a pin arrangement, etc.)

With continued reference to FIG. 2, the interface 110 according to an embodiment of the present disclosure may be connected to the external sensor package 200 including at least one sensor 220. Here, the connection of the interface 110 and the external sensor package 200 may be an electrical connection through physical coupling or mounting. The interface 110 according to an embodiment may be configured by a standardized form in which physical conditions (e.g., a shape of a connector, a pin arrangement, etc.) have been standardized.

The processor (i.e. controller) 120, which includes hardware circuitry configured for operation including but not limited to an integrated circuit, may support execution of an initialization process by controlling power supply to the components of the electronic device 100 and control the components when the initialization process is completed.

The processor 120 according to an embodiment may include a plurality of processors or sub-processors. For example, the processor 120 may be include at least one among a first processor (for example, an application processor (AP), etc.) that performs complex calculations and high-performance graphics, a second processor (for example, a communication processor (CP), etc.) that may be dedicated to communications with a network, for example, via a LTE or 3G, and a third processor (for example, a supplementary processor (SP), etc.) that performs functions at lower power consumption than at least the first or second processor.

The processor 120 according to an embodiment of the present disclosure may recognize the connection of the external sensor package 200. The processor 120 according to an embodiment may detect a voltage value of a General Purpose Input Output port (GPIO) of the processor 120. According to an embodiment, the processor 120 may detect that the GPIO port voltage value before the external sensor package 200 is coupled or attached to the interface 110, which indicates a relatively high voltage value (for example, 1.8V, and 2.0V, etc.) compared to ground. According to an embodiment, since the external sensor package 200 is coupled or attached to the interface 110, the processor 120 may detect that the GPIO port voltage value is changed to the voltage value at ground (for example, 0V, etc.). The processor 120 according to an embodiment may recognize the connection of the external sensor package 200 depending on the change of the GPIO port voltage value to the voltage value at ground. The processor 120 according to an embodiment of the present disclosure may determine the type of the sensor 220 included in the recognized external sensor package 200.

The processor 120 according to an embodiment of the disclosure may identify a voltage information value, which is sensed at an area of the processor 120, corresponds to the sensor 220, and is stored in the storage module 140, and an identification information value corresponding to the sensor 220. The processor 120 according to an embodiment may identify a voltage level value sensed at one port (e.g., a GPIO ID detection port, etc.) of the processor 120. For example, when the voltage level sensed at the one port of the processor 120 is 0.45V, a sensor 220 included in the external sensor package 200 may be determined as a proximity sensor on the basis of a table stored in the storage module 140.

The processor 120 according to an embodiment may transmit the slave address (ID), from 0 bit (e.g., 0000 0000) thereof to the external sensor package 200 on the basis of Inter-Integrated Circuit (I2C) communication. The transmission of the slave address may be transmitted sequentially. The processor 120 according to an embodiment may transmit to the external sensor package 200 in a pre-stored sequence (e.g., the sequence specified by a user or a provider, the sequence specified by call frequency, etc.). For example, when the slave address (ID) is a hexadecimal number "0005 1234", the processor 120 may extract some types of the sensor 220 by transmitting "0005" first and transmit "1234" to the extracted sensor 220.

The processor 120 according to an embodiment may determine the type of sensor on the basis of the upper four-digit bits in the hexadecimal number. For example, Referring to Table 1, by checking the "0002" in the identification information "0002 0001" of the geomagnetic sensor, the processor 120 may determine that the geomagnetic sensor is included in the external sensor package 200. In another example, referring to Table 1, identification number of the proximity and optical sensor is stored as "0004 1001", and the processor 120, by checking the "0004" which is the upper bits of the hexadecimal number, may determine that the proximity sensor is included in the external sensor package 200.

When determining the upper four-digit bits of the hexadecimal number for identification information including at least two sensors, the processor 120 according to an embodiment may give a priority to the upper four-digit bits having the smaller value. For example, when the upper four-digit bits of the proximity sensor is "0004" and the upper four-digit bits of the optical sensor is "0005", the identification information of the proximity and optical sensor may give the priority to the proximity sensor having the smaller bit value and determine the upper four-digit bits of the proximity and optical sensor as "0004".

The upper four digits of a hexadecimal number of the identification information of Table 1 according to an embodiment may be determined on the basis of the types of independent sensors. For example, referring to Table 1, the gyroscope can be assigned as "0003," the proximity sensor can be assigned as "0004," and the light sensor can be assigned as "0005". The upper four-digit bits of the hexadecimal number corresponding to each sensor can be changed and updated. Lower four-digit bits of identification information in Table 1 may vary depending on the version and the manufacturer of each sensor, and the like.

When the processor 120 according to an embodiment of the present disclosure receives an acknowledge character (ACK) from the external sensor package 200, the processor 120 may determine the type of the sensor on a basis of the Table 1, which is stored in advance. For example, when the identification information value (for example, the acknowledgment character, etc.) received by the processor 120 is "0005 0001", the processor determines that one sensor 220 included in the external sensor package 200 is an optical sensor.

TABLE 1

| Identification information (ID: Identification) | Sensor type |
| --- | --- |
| 0000 0001 | Acceleration sensor |
| 0001 0001 | Atmospheric pressure sensor |
| 0002 0001 | Geomagnetic sensor |
| 0003 0001 | Gyroscope |
| 0004 0001 | Proximity sensor |
| 0005 0001 | Optical sensor |
| 0006 0001 | Temperature sensor |
| 0007 0001 | Humidity sensor |
| 0008 0001 | Gesture sensor |
| 0009 0001 | Ultraviolet-ray sensor |
| 0010 0001 | Grip sensor |
| 0011 0001 | Fingerprint sensor |
| 0012 0001 | Hall sensor |
| 0013 0001 | Short-range wireless communication sensor |
| 0014 0001 | Heart rate sensor |
| 0004 1001 | Proximity and optical sensor |
| 0000 1001 | Acceleration and gyro sensor |
| 0000 1002 | Acceleration and geomagnetic sensor |
| 0000 1003 | Acceleration, geomagnetic, and gyro sensor |
| 0006 1001 | Temperature and humidity sensor |

Here, the identification information value can be updated, and sensors that have the same purpose but perform different functions from each other may be configured by identification information values different from each other.

The processor 120 according to an embodiment of the present disclosure may sequentially determine the type of the sensor 220 when multiple sensors 220 are included in the external sensor package 200. For example, when a first external sensor package 200 configured by a first sensor and a second sensor and the second external sensor package 200 configured by a third sensor are connected to each other, the processor 120 may sequentially determine the types of the first sensor, the second sensor, and the third sensor.

According to an embodiment of the present disclosure, when sequentially determining each type of the sensor 220, the processor 120 may, for example, sequentially determine, the function provided from the respective sensors 220 on the basis of at least one information value among the voltage information value sensed at one area (for example, a port, a pin, etc.) of the processor 120 corresponding to the respective sensors 220 and the identification information value corresponding to the respective sensors 220.

According to an embodiment of the disclosure, the processor 120 may transmit a signal for requesting an update of information to the server 300 when the processor determines that the identification information value corresponding to the sensor 220 is not stored. For example, when receiving the update information from the server 300, the processor 120 may update the identification information value described in Table 1 on the basis of the received information.

According to an embodiment of the disclosure, the processor 120, which includes hardware circuitry configured for operation and may also be referred to a controller, may determine which group the external sensor package 200 is included in among the pre-configured groups on the basis of the function provided by the sensor 220. Here, the pre-configured groups may mean groups that are classified by particular criteria. Here, the groups may be configured or changed by the user or the provider.

For example, an activity group on the basis of the user's motion may include an accelerometer sensor, a gyroscope, a geomagnetic sensor and an atmospheric pressure sensor. In another example, an environmental group on the basis of the measurement of the surrounding environment may include an ultraviolet sensor, the temperature/humidity sensor, a voice sensor, a gas sensor, and an illuminance sensor. For example, the control group on the basis of the control of a particular service may include, for example, a proximity sensor, a gesture sensor, a touch sensor, and a gyroscope. Further, a bio group on the basis of the biological information of the user of the electronic device 100 may include, for example, a heart rate sensor and the fingerprint sensor. Furthermore, a health group associated with exercise may include an acceleration sensor, a heart rate sensor and a UV sensor.

Here, the activity group, the environmental group, the control group, the bio-group and health group may adjust the acquisition period of the sensor data included in each group, in order to execute the functions corresponding to the above-mentioned groups. For example, the environmental group may activate the sensors included in the environmental group on a minute or hourly basis and acquire the sensor data, and the health group may activate the sensors included in the health group at one day intervals and acquire the sensor data. The detection time corresponding to each group can be adjusted and changed as desired.

The processor 120 may determine that the type of sensor 220 included in the external sensor package 200 is, for example, the acceleration sensor, the gyroscope, the geomagnetic sensor and the atmospheric pressure sensor. The processor 120 may determine a group corresponding to the external sensor package 200 as an activity group. For example, when the group corresponding to the external sensor package 200 is included in the activity groups, the processor 120 may relatively shorten (for example, a few millisecond, etc.) the time of sensor data obtained by each sensor 220 in order to accurately determine the user's movement.

The processor 120 according to an embodiment of the present disclosure may control the performance of a function corresponding to a group determined by the external sensor package 200 among the pre-configured groups. The processor 120 according to the embodiment may control the execution of the application on the basis of the sensor data provided by the group including the sensor 220 included in the external sensor package 200. The processor 120 may control the display module 150 to display, on the screen, the sensor data detected by the sensor 220 included in the external sensor package 200. For example, when the external sensor package 200 includes an illuminance sensor and a temperature sensor, the processor 120 may equal to or control the display module 150 to display, on an output screen of the display module, a text image (e.g., 100 lux, 25 degrees) associated with the sensor data obtained by each of the sensor 220.

The processor 120 according to an embodiment of the present disclosure may control the deactivation a function corresponding to the group that includes the external sensor package on the basis of the status information on the electronic device 100.

The processor 120 according to an embodiment of the present disclosure may check the battery condition of the electronic device 100, and when the checked battery condition reaches the pre-configured battery condition, the processor 120 may deactivate the function corresponding to the group. For example, when the battery condition of the electronic device 100 is 15% when compared to the full charge (e.g., 95% or more charge or 99% charge, etc.), the processor 120 may deactivate the function corresponding to a group that includes the external sensor package 200.

The processor 120 according to an embodiment of the present disclosure may identify the temperature value of at least one of the processor 120 and the battery of the electronic device 100, and when the identified temperature value is equal to or greater than the pre-configured critical temperature value, the processor 120 may deactivate a function corresponding to a group. For example, when the temperature value of at least one of the processor 120 and the battery of the electronic device 100 is 40 degrees or more, the processor 120 may deactivate the function corresponding to the group that includes the external sensor package 200.

The processor 120 according to an embodiment of the present disclosure may identify a capacitance value usable by the storage module 140 of the electronic device 100, and when the identified capacitance value is equal to or less than the pre-configured critical capacitance value, the processor 120 may control deactivation of a function corresponding to a group that includes the external sensor package 200. For example, when the capacitance value usable by the storage module 140 of the electronic device 100 is 85% or more when compared to the full capacity, the processor 120 may deactivate the function corresponding to the group that includes the external sensor package 200.

The processor 120 according to an embodiment of the present disclosure may control the display module 150 to display, on the screen, a graphic user interface corresponding to the group that includes the external sensor package 200. For example, the processor 120 may control the display module 150 to display, on the screen, the sensor data detected by the external sensor package 200, manufacturer information, information on the sensor type, sensor sensing period information, feedback information corresponding to the detected sensor data, information on whether the external device is connected, and a command input item that may change the execution of functions of the external device.

The processor 120 according to an embodiment of the present disclosure may identify a function corresponding to a group that includes the external sensor package 200. The processor 120 may determine whether an application that provides a particular service is stored on a basis of the identified function. When the processor determines that the application is stored, the processor 120 may control the display module 150 to display, on the screen, a graphic user interface associated with the stored applications.

For example, the processor 120 may determine whether the health application that provides a health service using the heart rate sensor and the acceleration sensor is stored in the storage module 140. When the processor determines that the health application is stored, the processor 120 may display, on the screen, an image item requesting whether the health application is activated, or control the health application to be executed automatically.

The processor 120 according to an embodiment of the present disclosure may determine whether the application corresponding to the group that includes the external sensor package 200 is stored in the storage module 140. When the application is not stored in the storage module 140, the processor 120 may control a communication module 130 so as to transmit a signal requesting the application information that provides a particular service to the server 300 on the basis of the identified functions.

For example, when the group included in the external sensor package 200 is an activity group using the acceleration sensor, the gyroscope sensor, the atmospheric pressure sensor, and the geomagnetic sensor, the processor 120 may transmit, to the server 300, a signal requesting application information performed on the basis of the functions of the acceleration sensor, the gyroscope sensor, the atmospheric pressure sensor and the geomagnetic sensor.

The processor 120 according to an embodiment of the present disclosure may receive application information that provides a particular service on the basis of the function identified from the server 300. The processor 120 according to an embodiment may control the display module 150 to display, on the screen, a graphic user interface associated with the received application on the basis of the received application information.

The processor 120 according to an embodiment may control the communication module 130 so as to receive an application providing at least one function among the functions provided by the group included in the external sensor package 200. For example, when transmitting, to the server 300, a signal requesting application information using the acceleration sensor and the atmospheric pressure sensor, the processor 120 may further receive application information that uses the acceleration sensor. The processor 120 according to an embodiment may control the display module 150 to display a list, on the screen, by configuring the list of the received application information. When displaying the list of the received application information, the processor 120 may display the prioritized application information on the basis of the number of types of sensor 220 that are included in the external sensor package 200 to be utilized in the received application.

Here, the received application information may include, for example, at least one image from among thumbnail images of the received application, text images associated with the sensor utilized in the received application, text images that describe the functions provided from the received application, and shortcut icon images that can store the received application.

The communication module 130, which includes hardware such as a transmitter, receiver, or transceiver, and an antenna array, may communicate with an external device. The communication module 130 according to an embodiment may communicate with the external device (e.g., a server 300, another electronic device (e.g., a humidifier, a refrigerator, TV, etc.) via a wireless communication or wired communication. The wireless communication may include at least one of, for example, Wi-Fi, Bluetooth (BT), Near Field Communication (NFC), Global Positioning System (GPS) and cellular communication (e.g. LTE, LTE-A, CDMA, WCDMA, UMTS, WiBro, GSM, etc.). Also, the wired communication may include at least one of, for example, a Universal Serial Bus (USB), a High Definition Multimedia Interface (HDMI), Recommended Standard 232 (RS-232), and a Plain Old Telephone Service (POTS).

According to an example of the present disclosure, when an application that provides a particular service is not stored on the basis of the function corresponding to the group that includes the external sensor package 200, the communication module 130 may transmit, to the server 300, a signal requesting the application information that provides the particular service on the basis of the function corresponding to the group. According to an embodiment, the communication module 130 may receive the application information that provides the particular service in response to the signal requesting the application information from the server 300.

The storage module 140, which includes a non-transitory memory, may store commands or data generated by the processor 120 or other components (e.g., the communication module 130, the display module 150, etc.). The storage module 140 may include software, firmware, hardware, or a combination of at least two thereof. The storage module 140 according to an embodiment may store the voltage information value and the identification information value corresponding to the type of sensor 220 included in the external sensor package 200.

The display 150 module, which includes a display such as a thin-film display with touch sensors, may display, on the screen, the user interface that provides various pieces of information (for example, multimedia data or text data) to the user. The display module 150 according to an embodiment may be omitted depending on the type of the electronic device 100.

The display module 150 according to an embodiment of the present disclosure may control the display module 150 so as to display, on the screen, a graphical user interface which corresponds to determined one group the external sensor package 200 is included in among the pre-configured group. For example, the display module 150 may control the display module 150 to display, on the screen, the graphic user interface associated with the sensor data detected by the determined one group.

The display module 150 according to an embodiment of the present disclosure may display the graphic user interface associated with the application on the screen, when the processor determines that an application that provides a particular service on the basis of the function corresponding to the group including the external sensor package 200 is stored in the storage module 140.

The external sensor package 200 may be coupled to the interface 110 of the electronic device 100. The external sensor package 200 may be physically mounted on the interface 110 and receive power from the electronic device 100.

The external sensor package 200 may include a controller 210 which is implemented in hardware including one or more processors having circuitry configured for operation, at least one sensor 220, and the pad 230.

The hardware of controller 210 may include a control circuit for controlling the at least one sensor. The controller 210 may be configured to process commands received through logical operations such as AND/OR/NOR/XOR on the basis of a clock signal applied through a pad 230. The controller 210 may be configured by basic hardware elements such as transistors, diodes, amplifiers, and resistors.

At least one sensor 220 may be at least one from among the gesture sensor, the gyro sensor, the atmospheric pressure sensor, the geomagnetic sensor, the acceleration sensor, the grip sensor, the proximity sensor, the biological sensor, the temperature sensor, the humidity sensor, the illuminance sensor, and the ultraviolet sensor. Further, at least one sensor 220 may include an olfactory sensor, an electromyography (EMG) sensor, an electroencephalogram (EEG) sensor, an electrocardiogram (ECG) sensor, an infrared ray (IR) sensor, an iris sensor, a fingerprint sensor (not shown), and the like.

The pad 230 may be a port and includes a pin which connects to the interface 110 of the electronic device 100. The pad 230 may be configured from pin 1 to pin 10, and each of the pins may be configured to apply power supply or to execute the I2C communication.

The server 300 may be a device (such as a server, proxy server, or base station) that provides a service to the electronic device 100 or another electronic device via a network.

The server 300 according to an embodiment of the present disclosure may receive, from the electronic device 100, a signal requesting the update of an identification information value (e.g., 0000 0032 (hexadecimal), octal, etc.) corresponding to the sensor 220. The server 300, in response to the received request signal, may transmit the update information of the identification information value corresponding to the sensor 220 to the electronic device 100.

The server 300 according to an embodiment of the present disclosure may receive, from the electronic device 100, a signal requesting application information that provides a particular service on the basis of the type of sensor 220. The server 300, on the basis of the type of sensor 220, may extract an application that provides a particular service. The server 300 may transmit the extracted application-related information to the electronic device 100.

FIGS. 2A to 2D are diagrams illustrating types of an electronic device 100 and an external sensor package 200 according to various embodiments of the present disclosure.

Figure 2A:
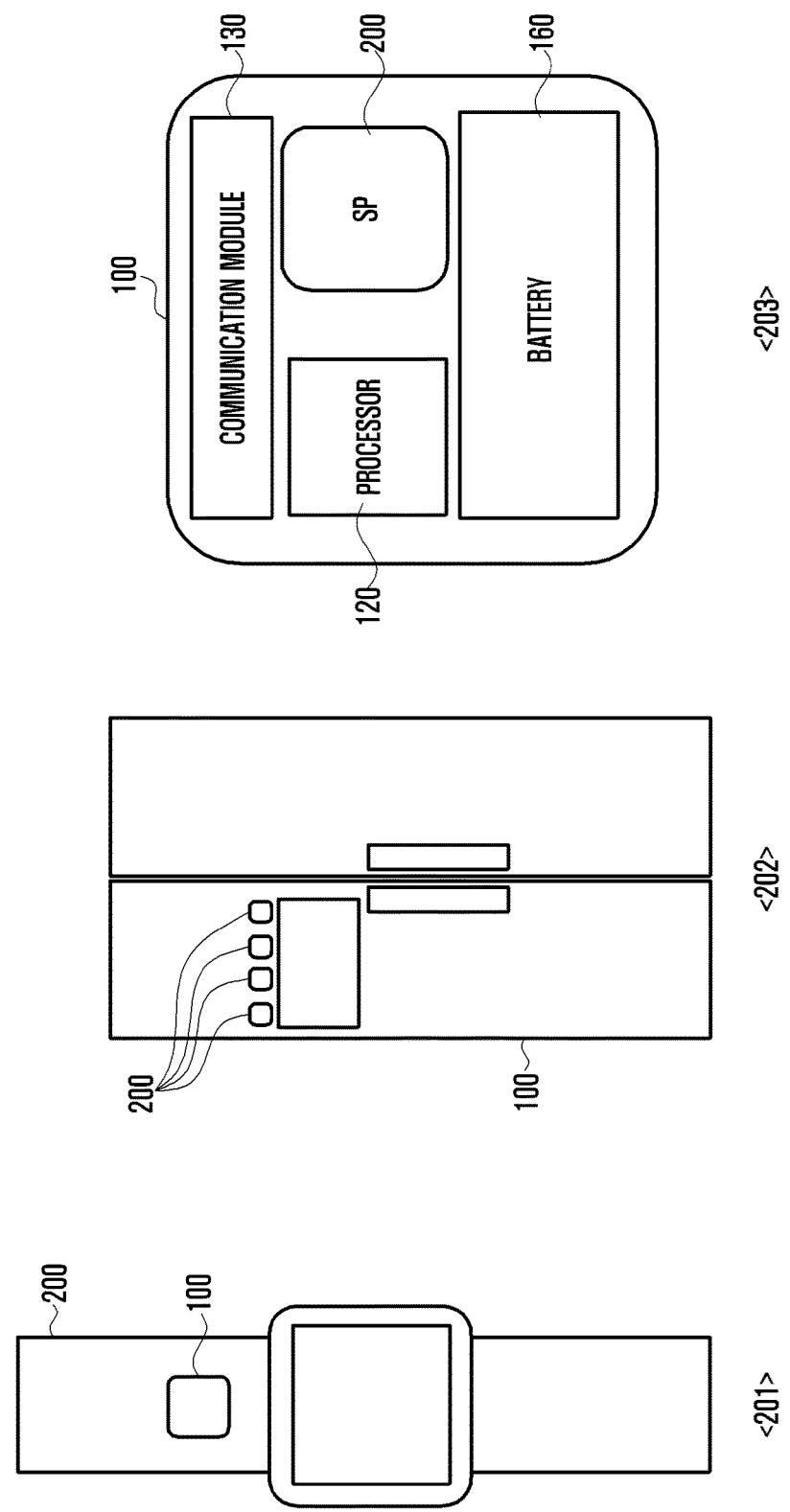

Referring now to FIG. 2A, the electronic device 100 may be a device including hardware configured for performing a communication function via wired or wireless communication. For example, the electronic device may include at least one of a smart phone, a tablet personal computer (PCs), a mobile phone, a video phone, an e-book reader, a desktop PC, a laptop PC, a netbook computer, a personal digital assistant (PDA), a portable multimedia player (PMP), a MP3 player, a mobile medical device, a camera, a wearable device (e.g., head-mounted-device (HMD) such as electronic glasses, electronic clothes, an electronic bracelet, an electronic necklace, an electronic appcessory, an electronic tattoo, or a smart watch).

According to various embodiments, the electronic device 100 may be a smart home appliance including a communication function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device 200 may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function.

Referring to 201 in FIG. 2A, the electronic device 100 may be a wearable device mounted on the wearable device 201. The wearable device, which contains the electronic device 100, may include a home area capable of coupling an external sensor package 200 to one area. The electronic device 100 has the external sensor package 200 coupled to the home area and thus can recognize the external sensor package 200.

Referring to 202, the electronic device 100 may be embodied as a refrigerator. The refrigerator, which corresponds to the electronic device 100, may include the home area capable of coupling an external sensor package 200 to one area. The refrigerator, which corresponds to the electronic device 100, may recognize the external sensor package 200 by which the external sensor package 200 is coupled to the home area.

According to another embodiment, a plurality (e.g., two, three, four, etc.) of external sensor packages 200 can be coupled to the electronic device 100. For example, a plurality of external sensor packages 200 which provide functions of detecting various types of smell (for example, fragrant smell, putrid smell, spicy smell, etc.) can be coupled to the electronic device 100. Further, for example, the home area capable of coupling the external sensor package 200 may be configured in three areas of the refrigerator which is the electronic device 100. The external sensor package 200, which detects the fragrant smell, the putrid smell, and the spicy smell, can be coupled to each of the three areas. The refrigerator, which corresponds to an electronic device 100, may acquire sensor data on the fragrant smell, the putrid smell, and the spicy smell.

Referring now to 203, the electronic device 100 may be a device capable of communicating in an Internet of Things based environment. The electronic device 100 may include a processor 120, a communication module 130, and a battery 160, and the home area capable of coupling the external sensor package 200 can be arranged. The electronic device 100 has the external sensor package 200 coupled to the home area and thus can recognize the external sensor package 200. The electronic device 100 according to an embodiment may transmit and receive the sensor data acquired through the communication module 130 to and from another electronic device. Referring now to items 204 to 207 in FIG. 2B, the electronic device 100 includes any of an air conditioner, a washing machine, a refrigerator and a TV such that one area is configured so as to couple the external sensor package 200. The electronic device 100 has the external sensor package 200 coupled to one area and thus can recognize the external sensor package 200.

When the electronic device 100 according to an embodiment is an air conditioner, the electronic device 100 can be connected to the external sensor package 200 for detecting an air condition. For example, when the electronic device 100 is an air conditioner, the electronic device 100 can be connected to the external sensor package 200 for detecting an air condition and then providing a control function of the air conditioner. When the electronic device 100 according to an embodiment is a washing machine, the electronic device 100 can be connected to the external sensor package 200 for detecting noise.

When the electronic device 100 according to an embodiment is a refrigerator, the electronic device 100 can be connected to the external sensor package 200 for detecting gas or temperature. For example, when the electronic device 100 is a refrigerator, it can be connected to the external sensor package 200 that provides a function for sensing a smell or authenticating a person.

When the electronic device 100 according to an embodiment is a TV, the electronic device 100 can be connected to the external sensor package 200 for sensing the illuminance. For example, when the electronic device 100 is the TV, it can be connected to the external sensor package 200 that includes at least one of the illuminance sensor and an IR light sensor 220. The external sensor package 200 which is connected to the electronic device 100 may be replaced with different types of external sensor packages 200 according to the user's interest.

Figure 2C:
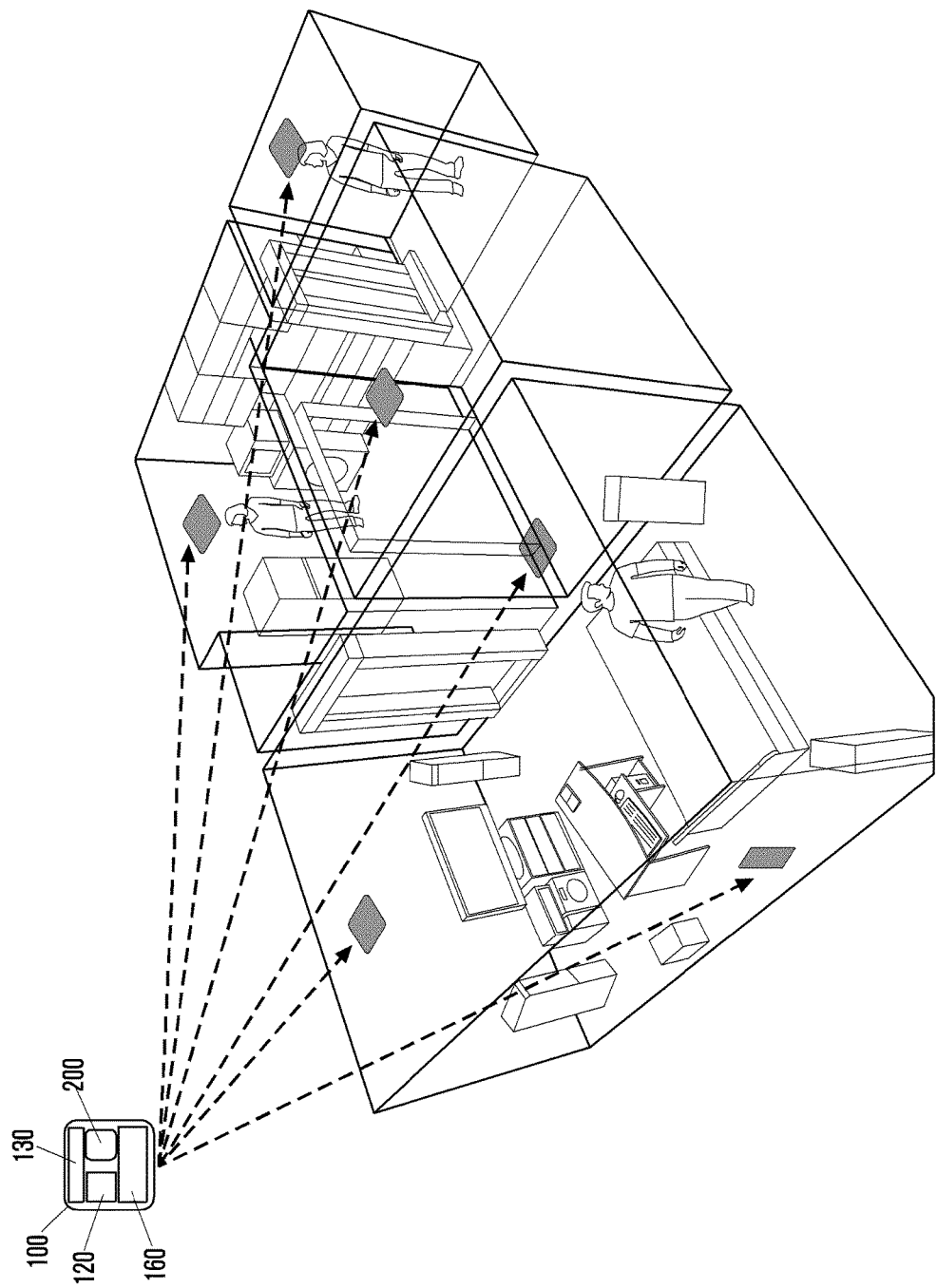
FIG. 2C and FIG. 2D are diagrams respectively illustrating arrangement of an electronic device in various locations of an automobile or an office.

Referring now to FIG. 2C, in an Internet of Things based environment, the electronic device 100 coupled to the external sensor package 200 may be attached, adhered, welded, fused, or coupled here and there in the house. The user of the electronic device 100 may identify sensor data detected by the external sensor package 200 that provides functions such as an illuminance sensor, a gas detection sensor, a temperature sensor, and a humidity sensor here and there in the house. For example, the external sensor package 200 coupled to the electronic device 100 may acquire sensor data (e.g., temperature data, humidity data, air condition data, gas data, etc.). Multiple types of the external sensor package 200 may be installed in the home and may be exchanged in accordance with the user's interest.

According to an embodiment, in the Internet of Things based environment, the electronic device 100 including the external sensor package 200 disposed in different locations in a home may acquire sensor data (e.g., temperature data, humidity data, etc.). The electronic device 100 including the external sensor package 200 may transmit and receive the acquired sensor data to and from another electronic device.

For example, humidity data acquired by the first electronic device may be transmitted to a second electronic device. The second electronic device may receive humidity data from the first electronic device. The second electronic device according to an embodiment, on the basis of the received humidity data, may perform a specific function (for example, power control of a device that performs a humidity control function).

Figure 2D:
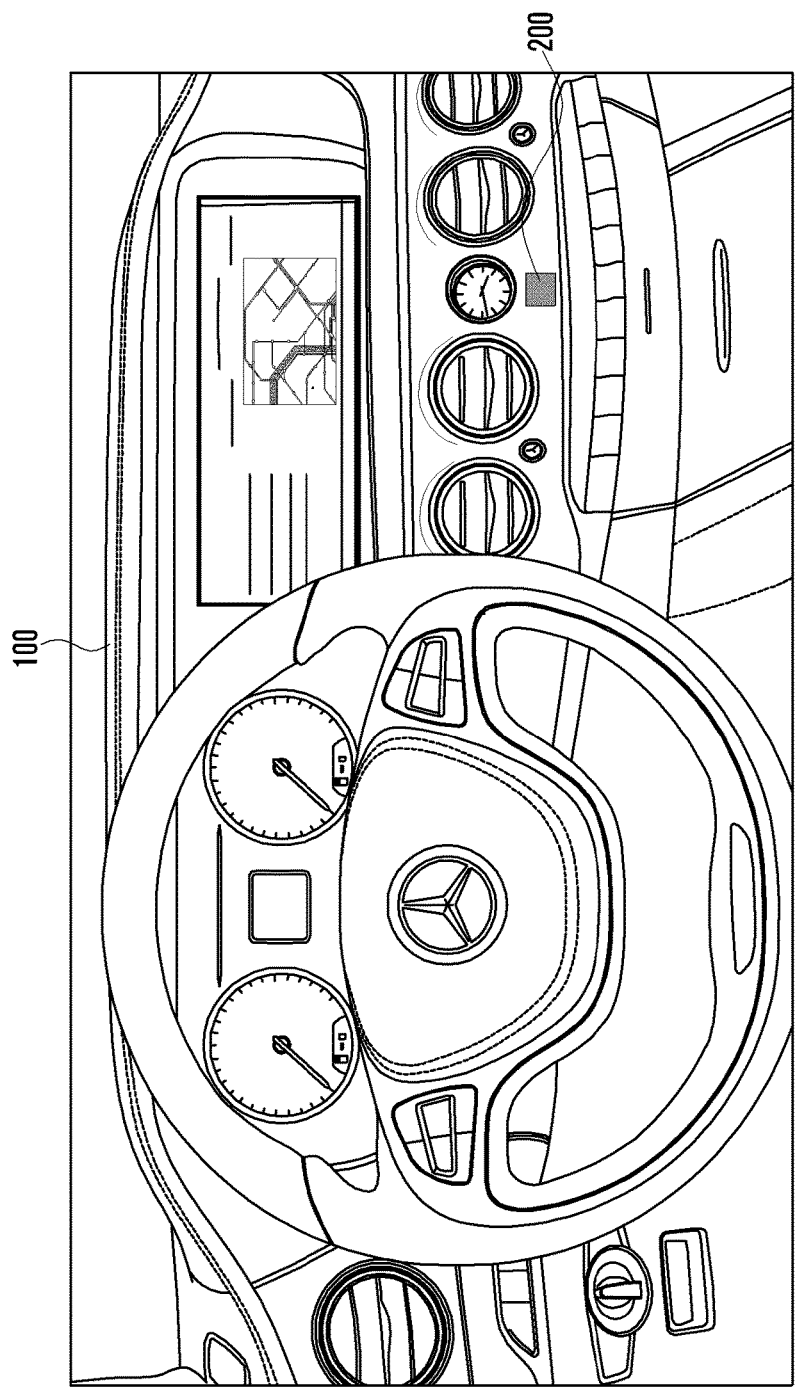

Referring now to FIG. 2D, the electronic device 100 may be a vehicle infotainment device. When the electronic device 100 is a vehicle infotainment device, the external sensor package 200 can be coupled to one area of the vehicle by attachment, adhesion or the like. The vehicle infotainment device, which corresponds to the electronic device 100, may recognize the external sensor package 200. For example, the external sensor package 200 attached to the vehicle may be the external sensor package 200 that provides the functions of the temperature sensor, the humidity sensor, the acceleration sensor, and the like.

Figure 3A:
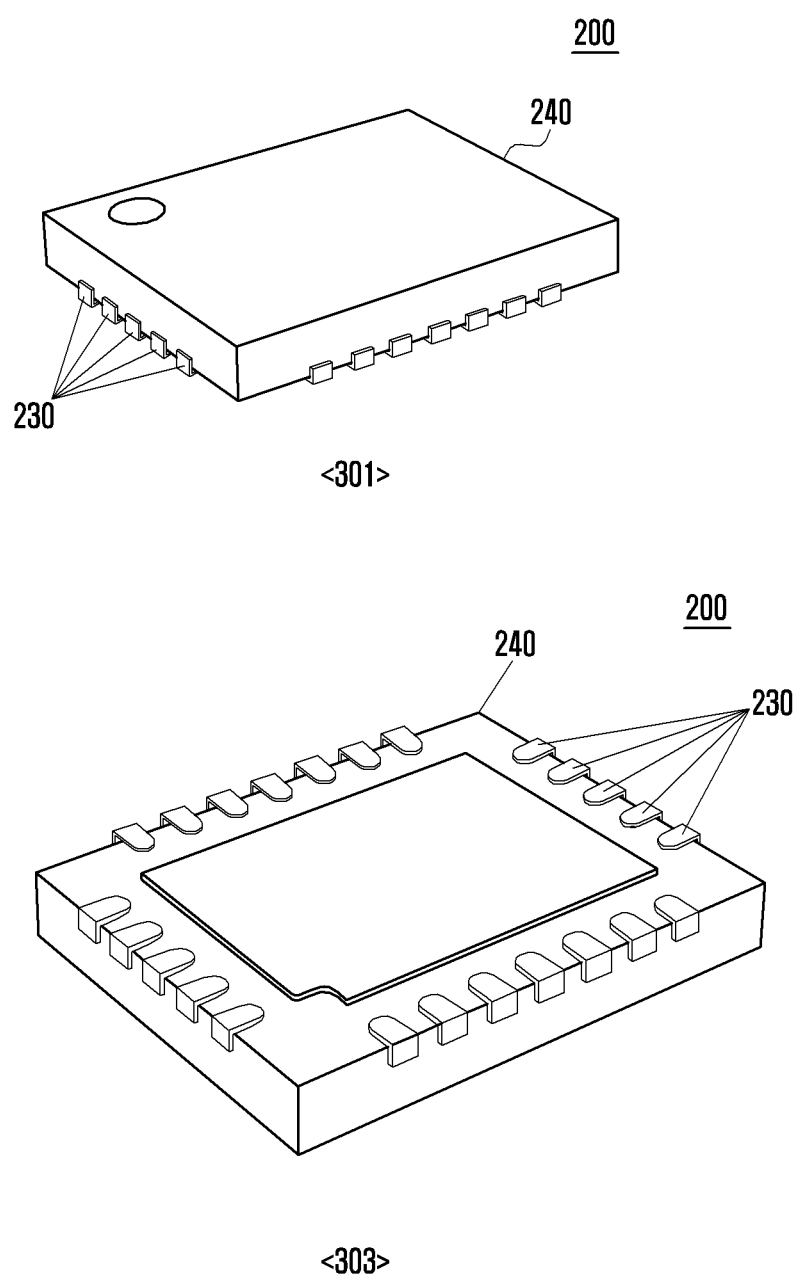
FIG. 3A and FIG. 3B are diagrams schematically illustrating various structural configurations of an external sensor package according to various embodiments of the present disclosure.
Figure 3B:
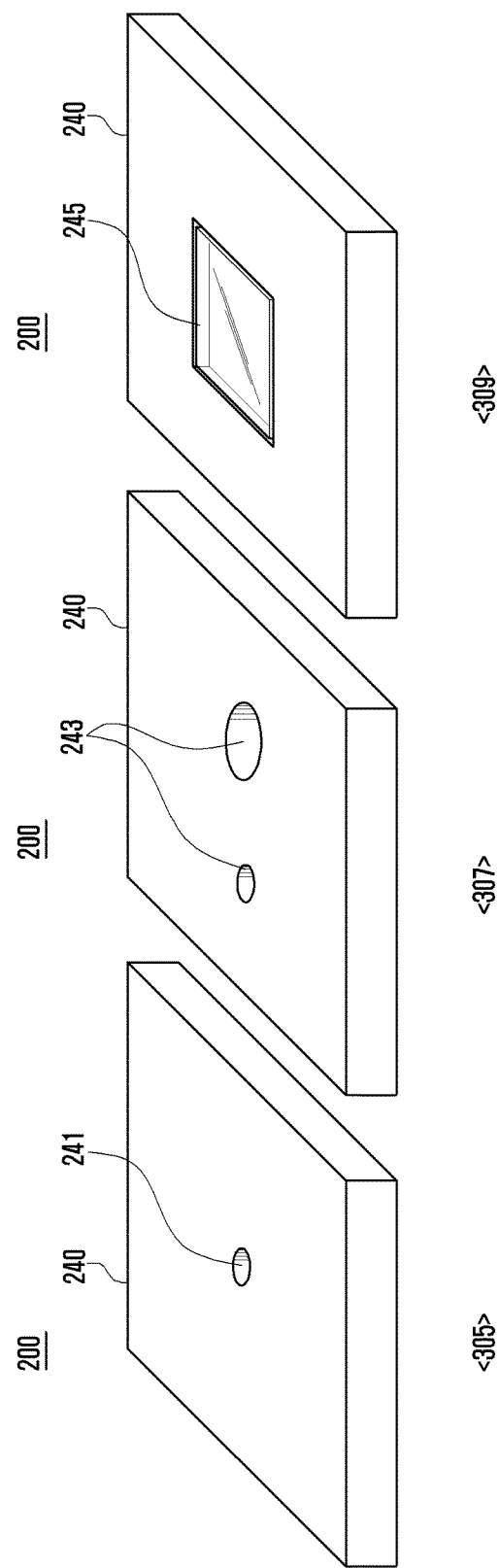

FIGS. 3A and 3B are diagrams schematically showing a configuration of an external sensor package 200 according to various embodiments of the present disclosure.

Referring now to items 301 and 303 in FIG. 3A, the external sensor package 200 may include, for example, a pad 230 and a housing 240.

The pad 230 may be configured by pins which are connected to the interface. The housing 240 may be a flexible material or rigid material.

The housing 240 may include any material including but not limited to jelly, plastic, rubber, leather, or Acrylonitrile Butadiene Styrene (ABS) resin, polyamide (PA), polyacetal (POA), polycarbonate (PC), modified polyethylene oxide (M-PRO), polybutylene terephthalate (PBT), polyimide (PI), polyphenylene sulfide (PPS), polyamide-imide (PAI), polyetherimide (PEI), polyetherketone (PEK), a liquid crystal polyester (LCP), alternating polypropylene (SPS), silicone, metal, or inorganic materials, or a synthetic material thereof. Further, for example, the housing 240 may be at least one among chamude, artificial leather, suede fabric, microfiber, rubber, urethane, silicon, leather, synthetic leather, and a fiber.

The housing 240 according to an embodiment may include a connecting link which can be affixed to the electronic device 100.

Referring now to items to 305, 307 in FIG. 3B, the housing 240 of the external sensor package 200 may include a hole 241 therein, or, for example two holes 243 therein, or a non-circular hole (not shown), irregularly shaped hole, etc. For example, the sensor 220 which provides various functions (for example, ultraviolet rays, gas, fingerprint sensor, temperature and humidity detection, etc.) can be coupled to the housing 240 by adhesion, welding, fusion, etc. In addition, for example, when a sound wave and a medium have to adhere to the inside of the sensor 220 (e.g., voice sensors, environmental sensors, etc.) depending on the function provided by the sensor 220, the housing 240 can be couple to the external sensor package 200 through the one hole 241 or the two holes 243.

Referring to item 309 in FIG. 3B, the housing 240 of the outer sensor package 200 may include a surface 245. Here, the surface 245 is not limited to the shape, and can be configured in the form of various shapes (e.g., a circular, a square, a triangular, a diamond, a non-linear shaped form, etc.). For example, the housing 240 of the external sensor package 200 may include a predetermined surface capable of acquiring an outside light, a sound wave, a material and electrode. For example, when the outside light has to be entered depending on the function provided by the sensor 220, the external sensor package 200 may include a circular surface which provides a function such as a lens or a photodiode of the external sensor package 200. Further, for example, when a function provided by the sensor 220 is a fingerprint sensor, the housing 240 of the external sensor package 200 may include a predetermined surface in order to obtain a human fingerprint.

The housing 240 according to an embodiment of the present disclosure may be configured alone or as a predetermined surface in various forms (e.g., a circular, triangular, rectangular, or non-linear shape and form). The shape and form of the housing 240 may vary depending on the type of sensor 220, and can be configured in various ways not limited to a particular form. In accordance with an embodiment, the housing 240 of the external sensor package 200 can be configured and changed according to the functions provided by the sensor 220.

Figure 4:
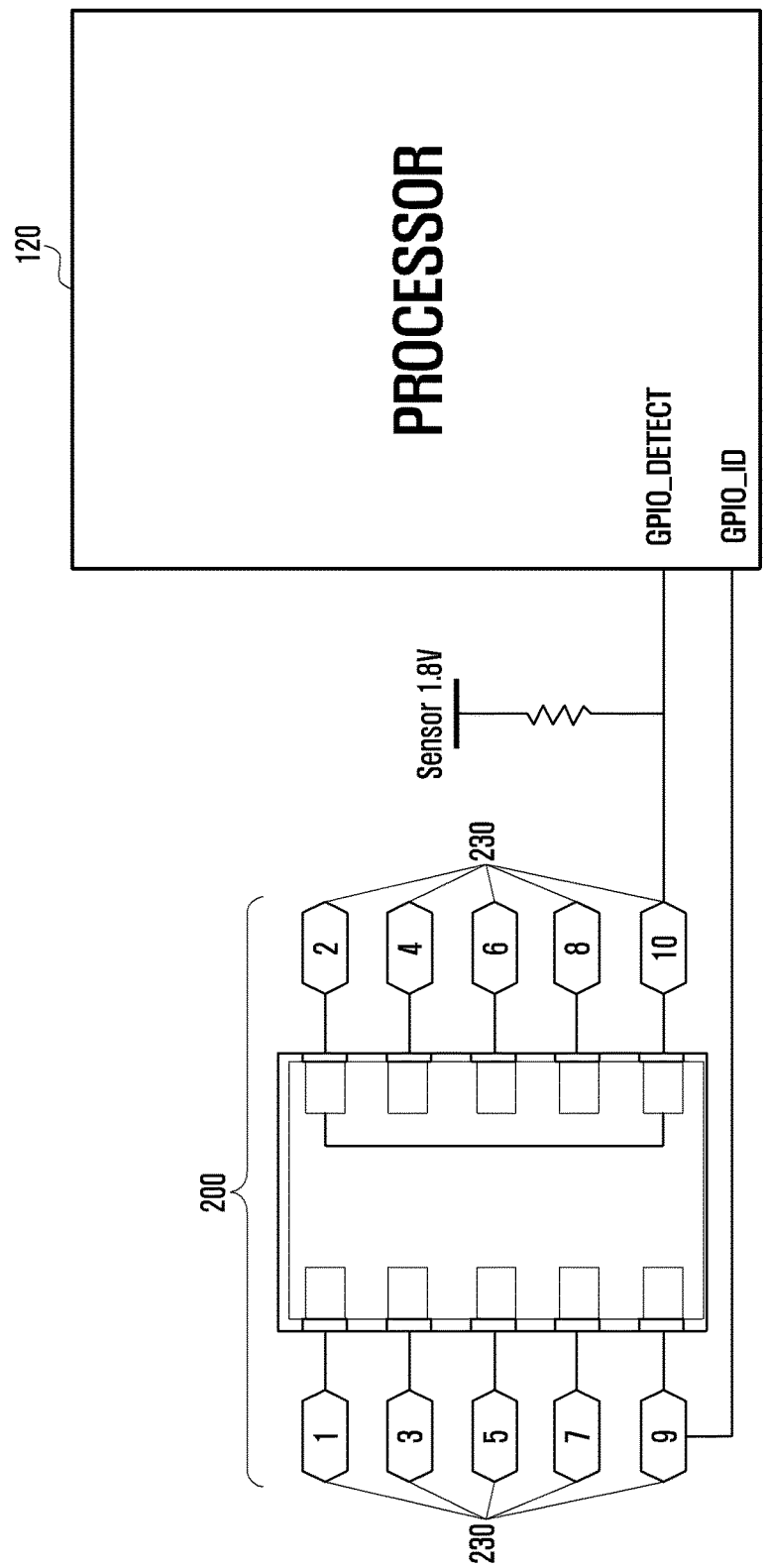
FIG. 4 is a diagram schematically illustrating the connection of a processor/controller and an external sensor package of an electronic device according to various embodiments of the present disclosure.

FIG. 4 is a diagram schematically showing the connection of the processor 120 and the external sensor package 200 of an electronic device 100 according to various embodiments of the present disclosure.

The external sensor package 200 may include ten pads 230. Here, the pad 230 refers to a pin connected with the processor 120.

For example, pin 1 may be a pin by which power is supplied to the external sensor package 200, and pin 2 may be a pin connected to a ground voltage. Pin 3 may be a pin for connecting power (for example, 1.8V, etc.) supplied to determine the input and output of the external sensor package 200, and pin 4 may be a pin connected to the ground voltage. Pin 5 may be a pin which applies a synchronization clock signal in an Inter-integrated circuit (I2C) communication, and pin 6 may be a pin which transmits and receives data (e.g., address, data, ACK, etc.) in the I2C communications. Pin 7 may be a pin which uses an interrupt mode in order to improve the current consumption, pin 8 may be a pin for initializing the sensor. Pins 9 and 10 may be pins by which it is possible to know the identification information for identification of the sensor 220 and whether the sensor has been recognized or not.

The processor 120 according to an embodiment of the present disclosure may recognize the connection of the external sensor package 200. When the external sensor package 200 is not connected or is not mounted, the processor 120 may detect, by a pull-up register, that the voltage of the GPIO port indicates 1.8V. The processor 120 may recognize that the external sensor package 200 is not connected, by detecting that the voltage of the GPIO port is higher than the ground voltage.

The processor 120, according to an embodiment, may detect the voltage of the GPIO port, which indicates a voltage lower than 1.8 V since the external sensor package 200 is connected or mounted thereto and the pin 2 and pin 10 of the pad 230 are thus internally connected (short). The processor 120 may recognize that the external sensor package 200 is connected thereto by detecting whether the voltage of the GPIO port is lower than the ground voltage.

Figure 5:
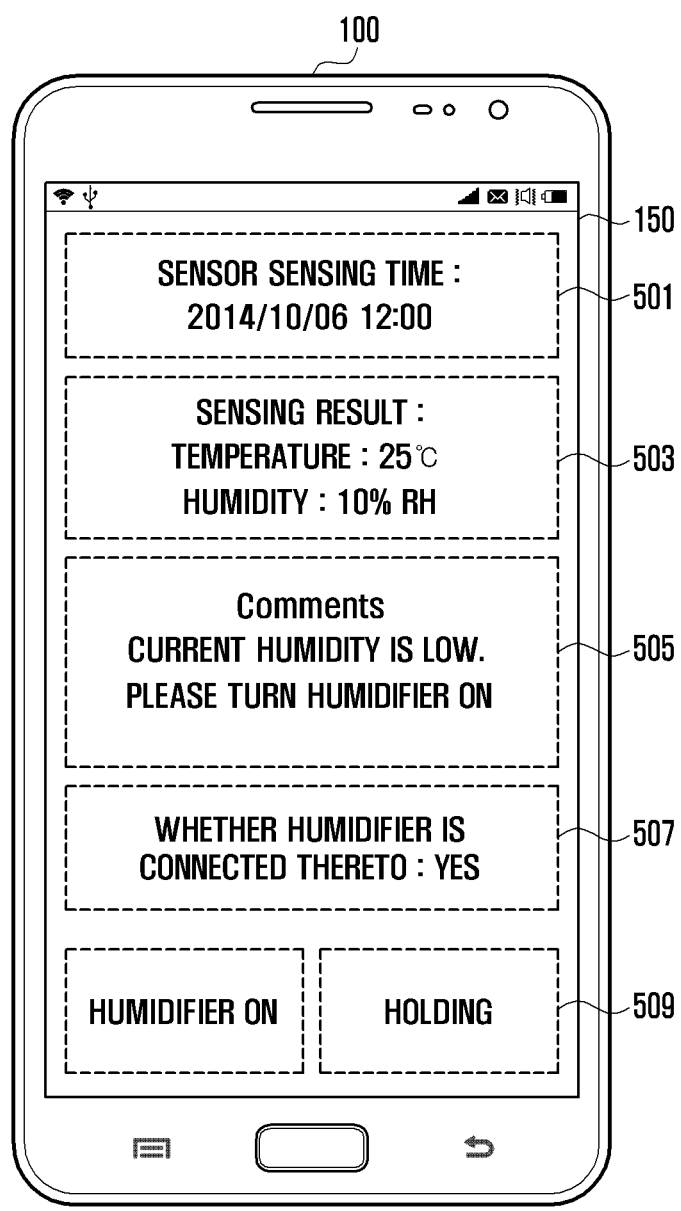
FIG. 5 is a diagram schematically illustrating a User Interface (UI) for displaying sensor data of an electronic device according to various embodiments of the present disclosure.

FIG. 5 is a diagram schematically showing a User Interface (UI) for displaying sensor data of an electronic device 100 according to various embodiments of the present disclosure.

According to an embodiment of the present disclosure, the display module 150 of the electronic device 100 may display the sensor data on the screen.

According to an embodiment, the display module 150 may display a sensor data time image item 501 on the screen, on the basis of the time at which the sensor data is measured by at least one sensor 220 included in the external sensor package 200. For example, when the time detected by the sensor 220 is "2014/10/06 12:00", the display module 150 may display a related UI on the screen.

According to an embodiment, the display module 150 may display a sensor data item 503 on the screen, on the basis of the sensor data measured by at least one sensor 220 included in the external sensor package 200. For example, when the sensor data detected by the sensor 220 are "temperature: 25, humidity 20% RH", the display module 150 may display a related UI on the screen.

The processor 120, according to an embodiment, may be configured to compare the sensor data which is previously stored in the storage module 140 and the sensor data received from the sensor 220. Here, the sensor data previously stored in the storage module 140 can be the user pre-configured temperature data, humidity data, heart rate data, and the like.

For example, when the sensor data received from the sensor 220 exceeds a margin of error (e.g., within 5%, within 10%, etc.) of the sensor data stored in advance in the storage module 140, the processor 120 may control so as to display a pre-configured comment on the screen. In addition, for example, when the humidity which is pre-configured by the user is "30% RH" and the humidity data received from the sensor 220 is "20% RH", the processor 120 may control the display module 150 to display, on the screen, a comment item 505 of which the comment is pre-configured in the storage module 140, the comment being "Current humidity is low. Please turn on the humidifier". Here, the comments can be stored in the storage module 140 in advance.

The processor 120 according to an embodiment may be configured to control the communication module 130 to be connected with other electronic devices (for example, a refrigerator, a humidifier, TV, etc.). For example, the communication module 130 may be connected to another electronic device via a wireless communication or near field communication. When receiving the reference data (for example, temperature data, humidity data, illumination data, heart rate data, and the like) pre-configured by the user and the sensor data exceeding a margin of error (e.g., within 5%, within 10%, etc.), the processor 120 may extract another electronic device capable of reducing the margin of error.

For example, when receiving 1 Lux sensor data lower than the illuminance data, 10 Lux, configured by the user, the processor 120 may extract a switching device capable of turning on a fluorescent lamp. The display module 150 may display, on the screen, a connection status item 507 which may identify whether the extracted device and the electronic device 100 are connected to each other.

The processor 120 according to an embodiment of the present disclosure may be configured to control transmitting, to other devices (e.g., a humidifier, air conditioner, etc.), a command request signal for switching (for example, turn-on, turn-off, volume adjustment, intensity regulation, etc.) via the communication module 130. The processor 120 according to an embodiment may control the display module 150 to display the command items 509 on the screen so as to execute the function by turning on the humidifier which is the extracted device. For example, when a user input for the command items 509 is detected, the processor 120 may transmit a signal requesting a turn-on command to the humidifier.

Figure 6:
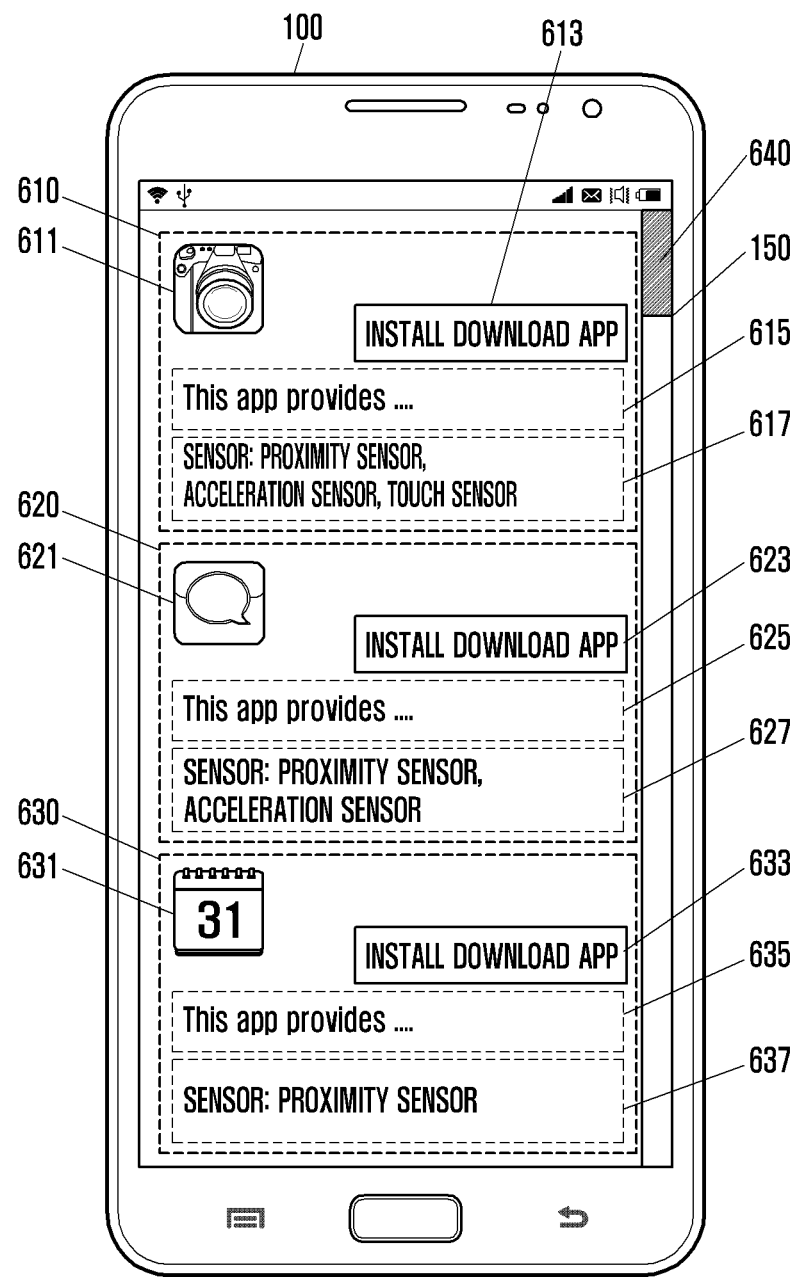
FIG. 6 is a diagram schematically illustrating a UI application including sensor data according to various embodiments of the present disclosure.

FIG. 6 is a diagram schematically showing an application UI including sensor data according to various embodiments of the present disclosure.

The processor 120 according to various embodiments of the present disclosure may be configured to identify the group that is included in the external sensor package 200 and identify whether the application which utilizes the sensor data provided by the identified group is stored in the storage module 140. When the application which utilizes the sensor data is not stored in the storage module 140, the processor 120 may control transmitting a signal requesting the application information to the server 300 via the communication module. The processor 120 may receive the application information from the server 300 via the communication module and display the application-related UI on the screen, on the basis of the received information.

The processor 120 may display, on the screen, a first application 610, a second application 620 and a third application 630 received from the server 300. The processor 120 may control the application displayed on the screen by detecting a moving input events for a scroll item 640.

The first application 610 may include a thumbnail image 611 of the first application, a downloading shortcut icon image 613 capable of storing the first application 610, a text image 615 for explaining functions provided from the first application 610, and a sensor type text image 617 utilized in the first application 610. Here, the sensor type text image 617 may be the type of sensor utilized by the first application 610. For example, the first application 610 may provide a particular service of the first application 610 using the proximity sensor, the acceleration sensor, and the touch sensor.

The processor 120 may receive the application information which utilizes at least one type of the types of sensors included in the external sensor package 200. For example, the processor 120 may receive the application information which utilizes at least one sensor when the type of sensors included in the external sensor package 200 is the proximity sensor, the acceleration sensor, and the touch sensor.

The second application 620 may include a thumbnail image 621 of the second application, a download shortcut image 623 capable of storing the second application 620, a text image 625 which describes functions provided from the second application 620, and a sensor type text image 627 utilized in the second application 620. Here, the sensor type text image 627 may be a type of sensor utilized by second application 620. For example, the second application 620 may provide a particular service of the second application 620 by utilizing the proximity sensor and the acceleration sensor.

The third application 630 may include a thumbnail image 631 of the third application, a download shortcut image 633 capable of storing the third application 630, a text image 635 which describes functions provided from the third application 630, and a sensor type text image 637 utilized in the third application 630. Here, the sensor type text image 637 may be a type of sensor utilized by third application 630. For example, the third application 630 may provide a particular service of the third application 630 by utilizing the proximity sensor.

Figure 7:
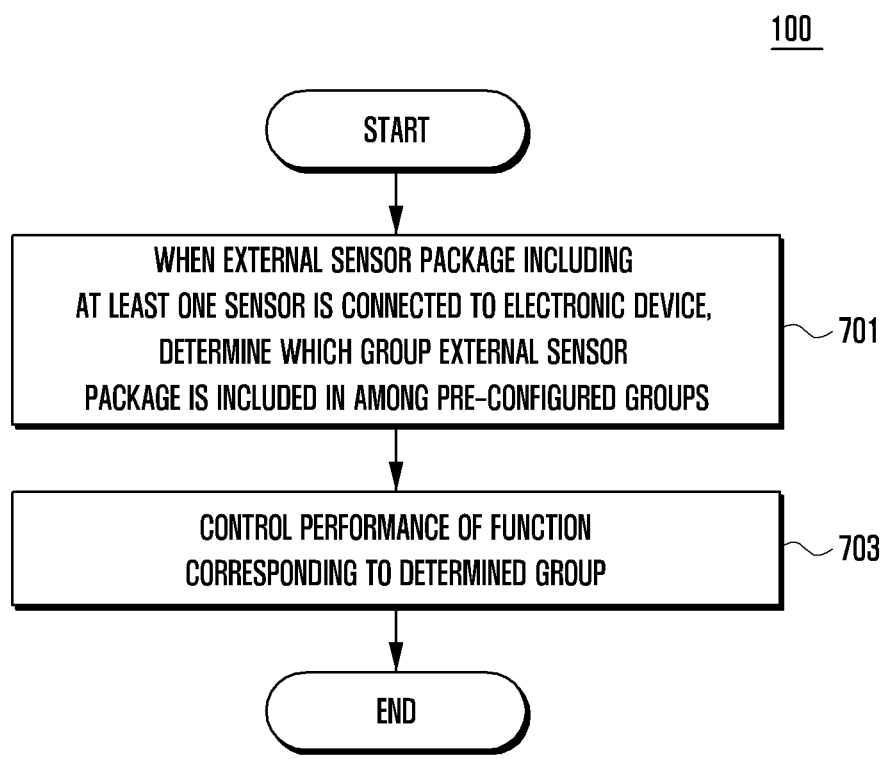
FIG. 7 is a flowchart providing an operational example of performing a function on the basis of sensor data according to various embodiments of the present disclosure.

FIG. 7 is a flowchart providing an operational example of performing the function on the basis of the sensor data according to various embodiments of the present disclosure.

In operation 701, when the external sensor package 200 including at least one sensor 220 is connected to the electronic device 100, the electronic device 100 may determine which group the external sensor package 200 is included in among the pre-configured groups.

The electronic device 100 according to an embodiment may recognize the connection of the external sensor package 200, when the external sensor package 200 is connected to the electronic device 100. The electronic device 100 may recognize the connection of the external sensor package 200 through a voltage change sensed at one area (e.g., one pin of a connector, etc.) of the electronic device 100.

The electronic device 100 according to an embodiment of the present disclosure may determine the type of the sensor 220 included in the recognized external sensor package 200. The electronic device 100 may determine the type of sensor 220 on the basis of a voltage value sensed at one area (e.g., one pin of a connector, etc.) of the electronic device 100 corresponding to the sensor 220, or an identification information value received from the external sensor package 200. For example, the electronic device 100 may determine the type of sensor 220 on the basis of the voltage value corresponding to the sensor 220 and stored in the storage module 140 and the identification information value table.

The electronic device 100, on the basis of the type of the determined sensor 220, may determine which group the external sensor package 200 is included in among the pre-configured groups. The pre-configured groups may be groups which are classified by any criterion (for example, the criteria according to the user's movements, the criteria associated with the acquisition of the sensor data, etc.).

In operation 703, the electronic device 100 controls the performance of the function corresponding to the determined group. For example, the electronic device 100 may adjust a data acquisition period of the sensors 220 that are included in the external sensor package 200 on the basis of the sensor data acquisition period corresponding to the determined group. Further, for example, the electronic device 100 may activate the application that provides a particular service on the basis of the type of sensor 220 included in the external sensor package 200.

Figure 8:
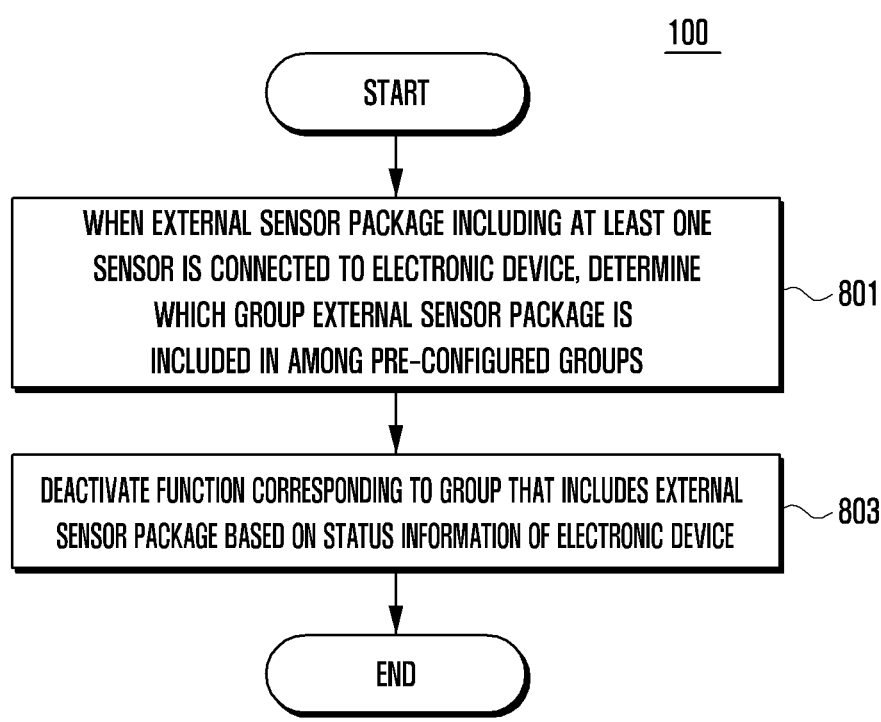
FIG. 8 is a flowchart providing an operational example of performing a function on the basis of the sensor data according to various embodiments of the present disclosure.

FIG. 8 is a flowchart showing an operational example of performing the function on the basis of the sensor data according to various embodiments of the present disclosure.

In operation 801, when the external sensor package 200 including at least one sensor 220 is connected to the electronic device 100, the processor of the electronic device 100 determines which group the external sensor package 200 is included in among the pre-configured groups.

According to an embodiment, when the external sensor package 200 is connected to the electronic device 100, the electronic device 100 may recognize the connection of the external sensor package 200. The electronic device 100 may recognize the connection of the external sensor package 200 via the voltage change sensed at the one area (e.g., one pin of a connector, etc.) of the electronic device 100.

The electronic device 100 may determine the type of the sensor 220 included in the recognized external sensor package 200. The electronic device 100 may determine the type of sensor 220 on the basis of the voltage value sensed at one area (for example, one pin of the connector, etc.) of the electronic device 100 corresponding to the sensor 220 or the identification information value received from the external sensor package 200. For example, the electronic device 100 may determine the type of sensor 220 on the basis of the voltage value corresponding to the sensor 220 stored in the storage module 140 and the identification information value table.

The electronic device 100, on the basis of the type of the determined sensor 220, may determine which group the external sensor package 200 is included in among the pre-configured groups. The pre-configured groups may be groups classified by any criterion (for example, the criteria according to the user's movements, the criteria associated with the sensor data acquisition, etc.).

In operation 803, the processor of the electronic device 100 controls deactivating the functions corresponding to the group that includes the external sensor package 200 on the basis of the status information on the electronic device 100. For example, when the battery state of the electronic device 100, the temperature value of the processor 120, or the memory capacity value of the storage module 140 satisfies a predetermined threshold value, the electronic device 100 may deactivate the function corresponding to the external sensor package 200 when recognizing the connection of the external sensor package 200.

Figure 9:
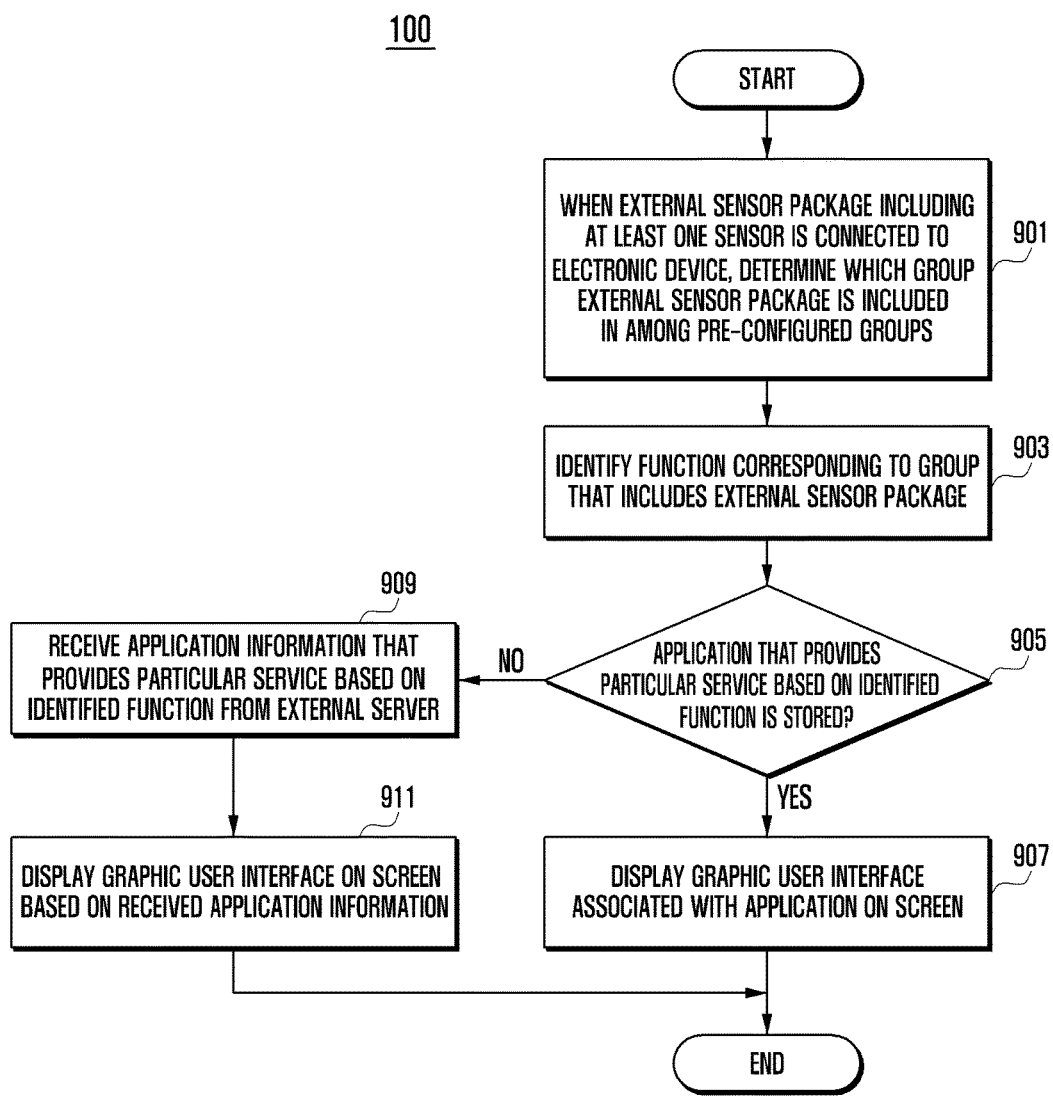
FIG. 9 is a flowchart providing an operational example of performing a function on the basis of the sensor data according to various embodiments of the present disclosure.

FIG. 9 shows a flowchart of performing the function based on the sensor data according to various embodiments of the present disclosure.

In operation 901, when the external sensor package 200 including at least one sensor 220 is connected to the electronic device 100, the electronic device 100 may determine which group the external sensor package 200 is included in among the pre-configured groups.

According to an embodiment, when the external sensor package 200 is connected to the electronic device 100, the electronic device 100 may recognize the connection of the external sensor package 200. The electronic device 100 may recognize the connection of the external sensor package 200 via the voltage change sensed at the one area (e.g., one pin of a connector, etc.) of the electronic device 100.

The electronic device 100 may determine the type of the sensor 220 included in the recognized external sensor package 200. The processor of the electronic device 100 may determine the type of sensor 220 based on the voltage value sensed at one area (for example, one pin of the connector, etc.) of the electronic device 100 corresponding to the sensor 220 or the identification information value received from the external sensor package 200. For example, the electronic device 100 may determine the type of sensor 220 on the basis of the voltage value corresponding to the sensor 220 stored in the storage module 140 and the identification information value table.

The processor of the electronic device 100, on the basis of the type of the determined sensor 220, may determine which group the external sensor package 200 is included in among the pre-configured groups. The pre-configured groups may be groups classified by any criterion (for example, the criteria according to the user's movements, the criteria associated with the sensor data acquisition, etc.).

In operation 903, the electronic device 100 identifies the function corresponding to the group that includes the external sensor package 200. In operation 905, the electronic device 100 determines, on the basis of the identified function, whether an application that provides a particular service is stored.

When the application that provides a particular service is stored in the storage module 140 on the basis of the identified function, the electronic device 100 may display a graphic user interface associated with the application on a screen, in operation 907. For example, the electronic device 100 may display, on the screen, the graphic user interface to request whether or not to execute the application (for example, health applications, game applications, etc.) that provides a particular service based on the external sensor package 200.

When the processor of the electronic device 100 determines that an application that provides a particular service is not stored in the storage module 140 based on the identified function, the electronic device 100 transmits the signal requesting application information that provides the particular service to an external server (for example, a server 300). The electronic device 100, in response to the transmitted signal, receives application information that provides the particular service from the external server (for example, a server 300) based on the identified function, in operation 909.

In operation 911, the electronic device 100 displays the graphic user interface on the screen based on the received application information. For example, the electronic device 100 may display, on the screen, a command item that may store the application in the storage module 140, and an image item representing the type of sensor 220 to be utilized by the application.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The apparatuses and methods of the disclosure can be implemented in hardware, and in part as firmware or as machine executable code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor, controller, control unit or other programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" or "microcontroller" include hardware in the claimed disclosure that contain circuitry that is configured for operation with software or firmware. Under the broadest reasonable interpretation, the appended claims implement statutory subject matter in compliance with 35 U.S.C. §101.

The definition of the terms "unit" or "module" as referred to herein is to be understood as including hardware circuitry such as a processor or microprocessor configured for a certain desired functionality, or a communication module containing hardware such as transmitter, receiver or transceiver, or a non-transitory medium including machine executable code that is loaded into and executed by hardware for operation, in accordance with statutory subject matter under 35 U.S.C. §101 and does not include software per se or pure software. Nor is the claimed disclosure an Abstract idea. The module may be another term for logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When the instruction is performed by at least one processor (for example, the processor 160), the at least one processor may perform a function corresponding to the instruction. The computer-readable storage medium may, for example, be the storage module 130. At least some of the programming modules may be implemented (for example, executed) by, for example, the processor 160. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Meanwhile, the example embodiments disclosed in the specification and drawings are merely presented to easily describe the technical contents of the present disclosure and help with the understanding of the present disclosure and are not intended to limit the present disclosure. Accordingly, the present disclosure should be construed that all modifications or modified forms derived based on the technical idea of the present disclosure are included in the present disclosure.

What is claimed is:

1. An electronic device comprising:
   an interface that is communicatively coupled to an external sensor package including at least one sensor; and
   a processor configured to:
      identify whether the external sensor package is communicatively coupled to the electronic device through the interface,
      determine, if the external sensor package is coupled to the electronic device, a type of the at least one sensor included in the external sensor package,
      determine, based on the determined the type of the at least one sensor, from which group the external sensor package is included from among one or more pre-configured groups, and
      control a performance of a function corresponding to the determined group.

2. The electronic device of claim 1, wherein the processor sequentially determines respective sensor types when multiple sensors are included in the recognized external sensor package.

3. The electronic device of claim 2, wherein, when the processor sequentially determines the respective sensor types on the basis of at least one information value among a voltage information value sensed by the processor corresponding to the respective sensors and identification information values corresponding to the respective sensors.

4. The electronic device of claim 1, wherein the processor is configured to deactivate a function corresponding to the group that includes the external sensor package on a basis of status information regarding the electronic device.

5. The electronic device of claim 4, wherein the processor is further configured to control to:
   check a battery condition of the electronic device, and deactivate the function corresponding to the group when the checked battery condition reaches a pre-configured battery condition;
   identify a temperature value of at least one of the processor and the battery of the electronic device, and deactivate a particular function corresponding to the group when the identified temperature value is equal to or greater than a pre-configured critical temperature value; and
   identify a capacitance value usable by a non-transitory memory of the electronic device, and deactivate another particular function corresponding to the group when the identified capacitance value is equal to or less than a pre-configured critical capacitance value.

6. The electronic device of claim 1, wherein the processor acquires sensor data on a basis of an acquisition period of the sensor data configured in the group that includes the external sensor package, or controls an execution of an application on a basis of the sensor data being provided by the group.

7. The electronic device of claim 1, wherein the processor identifies the function corresponding to the group that includes the external sensor package;
   determines whether an application that provides a particular service is stored on a basis of the identified function; and
   controls, responsive to a determination that the application is stored, a display module to display a graphic user interface associated with the application on a screen.

8. The electronic device of claim 7, further comprising a communication module including a transmitter that transmits to an external server, responsive to a determination that the application is not stored, a signal requesting application information that provides a particular service on the basis of the identified function.

9. The electronic device of claim 8,
   wherein the communication module receives, from the external server, the application information that provides the particular service on the basis of the identified function; and
   the processor of the electronic device controls the display module to display, on the screen, a graphic user interface associated with the received application on the basis of the received application information.

10. The electronic device of claim 9, wherein the graphic user interface associated with the received application includes at least one image among a thumbnail image of the received application, an image associated with sensor data utilized in the received application, a text image about the function provided from the received application, and a shortcut icon image that is selected to store the received application.

11. A method for performing a function using sensor data of an electronic device comprising:
    identifying whether an external sensor package including at least one sensor is communicatively coupled to the electronic device through an interface of the electronic device;
    determining, if the external sensor package is communicatively coupled to the electronic device, a type of the at least one sensor included in the external sensor package;
    determining, based on the determined the type of the at least one sensor, from which group an external sensor package is included in from among a plurality of pre-configured groups by a processor; and
    controlling a performance of a function corresponding to the determined group.

12. The method of claim 11, wherein determining the type of the at least one sensor included in the external sensor package by the processor of the electronic device comprises:
    sequentially determining the respective sensor types when multiple sensors are included in the recognized external sensor package.

13. The method of claim 12, wherein sequentially determining by the processor of the electronic device the respective sensor types when multiple sensors are included in the recognized external sensor package comprises:
    sequentially determining the types of the respective sensors of the multiple sensors, based on at least one information value from among a voltage information value sensed at the processor corresponding to the respective sensors and an identification information value corresponding to the respective sensors.

14. The method of claim 11, wherein the processor controlling of the performance of a function corresponding to the determined group comprises:
    controlling deactivating of a function corresponding to a particular group that includes the external sensor package based on the status information regarding the electronic device.

15. The method of claim 14, wherein the processor controlling to deactivate the function corresponding to the group that includes the external sensor package based on the status information on the electronic device comprises at least one of:
    checking a battery condition of the electronic device, and the processor of the electronic device controlling to deactivate the function corresponding to the group that includes the external sensor package when the checked battery condition reaches a pre-configured battery condition;

identifying a temperature value of at least one of the processor and the battery of the electronic device, and controlling to deactivate the function corresponding to the group that includes the external sensor package when the identified temperature value is equal to or greater than a pre-configured critical temperature value; and identifying a capacitance value operable by a memory of the electronic device, and controlling to deactivate the function corresponding to the group that includes the external sensor package when the identified capacitance value is equal to or less than a pre-configured critical capacitance value.

16. The method of claim 11, wherein the processor controlling of the performance of the function corresponding to the determined group comprises at least one of:

acquiring sensor data on a basis of an acquisition period of the sensor data configured in the group that includes the external sensor package; and controlling an execution of an application on a basis of the sensor data provided by the group.

17. The method of claim 11, wherein the processor controlling of the performance of the function corresponding to the determined group further comprises:

identifying the function corresponding to the group that includes the external sensor package;

determining whether an application that provides a particular service is stored on a basis of the identified function; and controlling a display module to display, on a screen, a graphic user interface associated with a stored application in response to determining that the application is stored.

18. The method of claim 17, further comprising, in response to the processor determining that the application is not stored, transmitting to an external server, a signal requesting application information that provides a particular service on the basis of the identified function.

19. The method of claim 18, further comprising:

receiving, from the external server, the application information that provides the particular service on the basis of the identified function; and controlling the display module to display, on an output screen, the graphic user interface associated with the received application on the basis of the received application information.

20. The method of claim 19, wherein the graphic user interface associated with the received application comprises at least one image provided from among a thumbnail image of the received application, a text image associated with the sensor utilized in the received application, a text image that describes the function provided by the received application, and a shortcut icon image that stores the received application.

* * * * *